Feb. 17, 1959 B. TURTELTAUB 2,873,769
PORTABLE LOCK FOR MOTOR VEHICLE PIVOTED WINDOWS
Filed Jan. 12, 1956 2 Sheets-Sheet 1
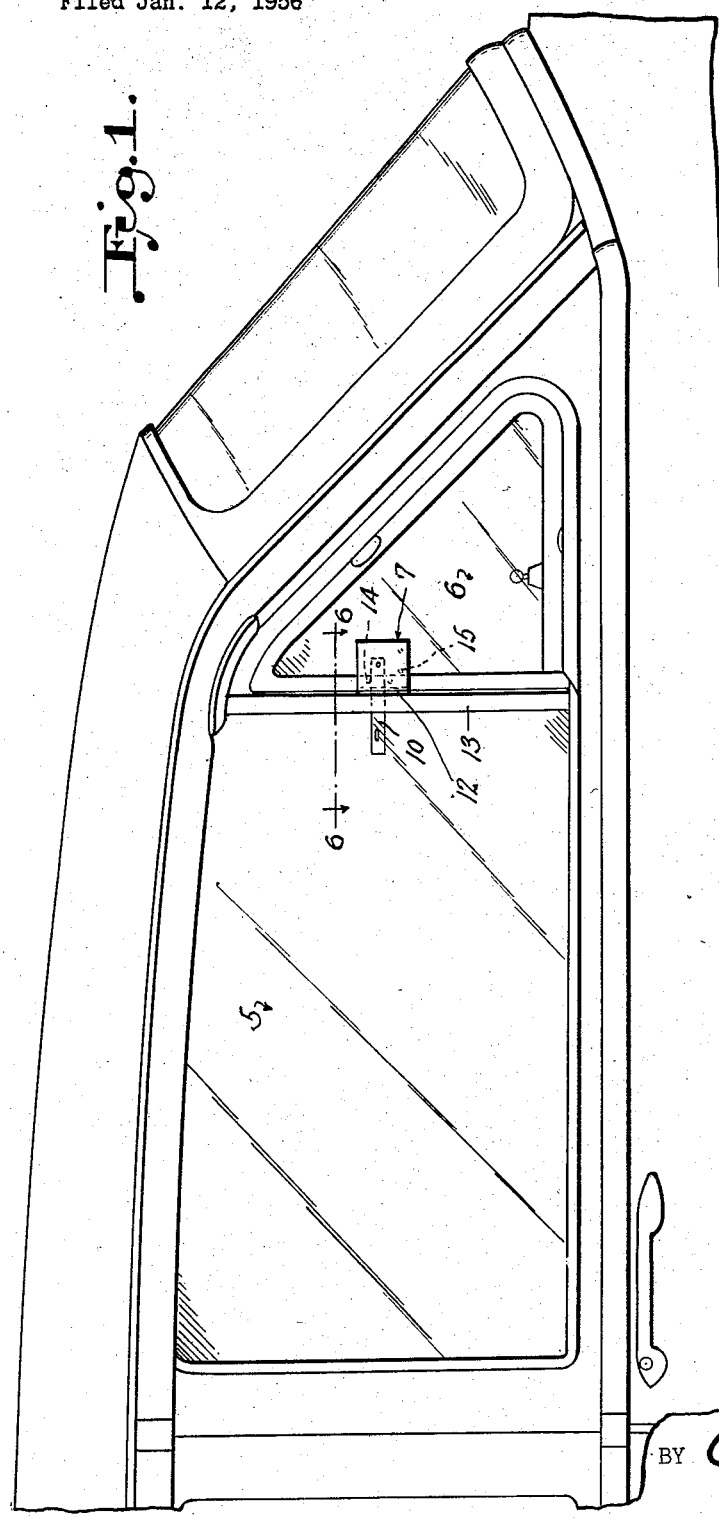
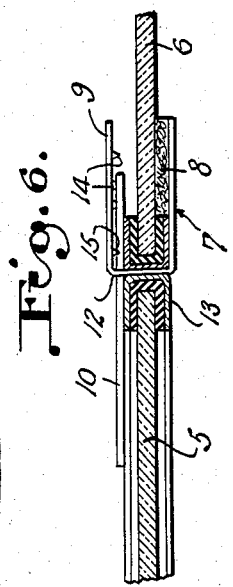
Bernard Turteltaub
INVENTOR
BY *Cl. Snow & Co.*
ATTORNEYS.

Feb. 17, 1959 B. TURTELTAUB 2,873,769
PORTABLE LOCK FOR MOTOR VEHICLE PIVOTED WINDOWS
Filed Jan. 12, 1956 2 Sheets-Sheet 2
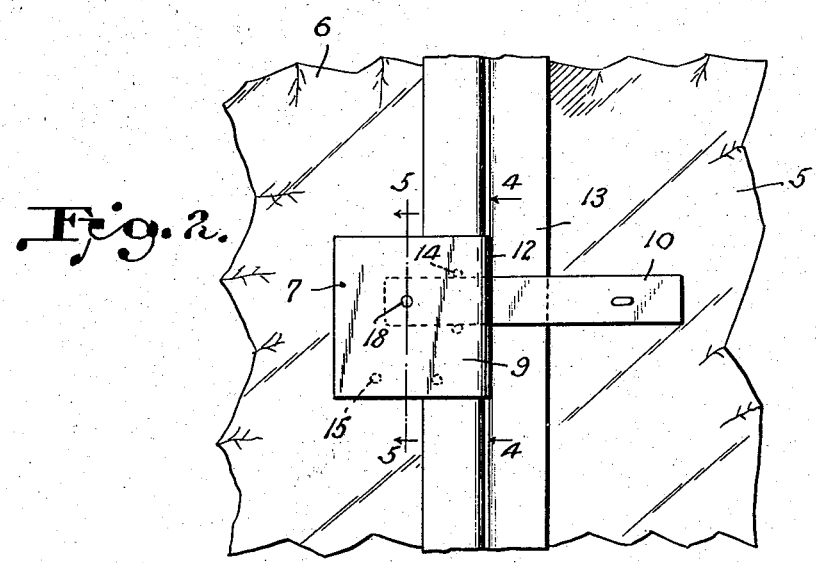
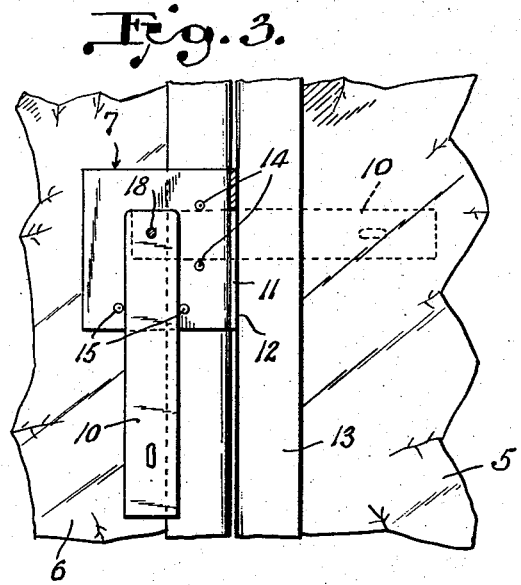
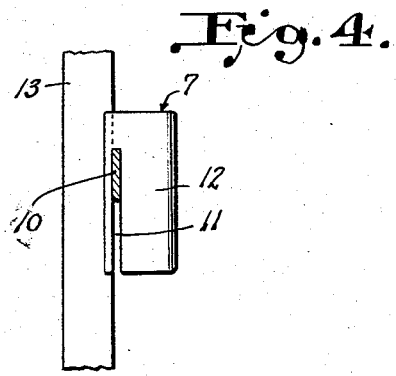
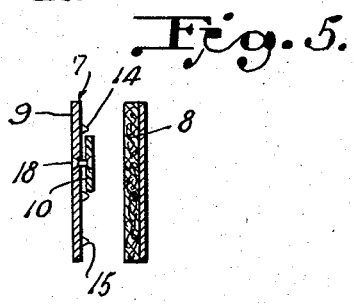
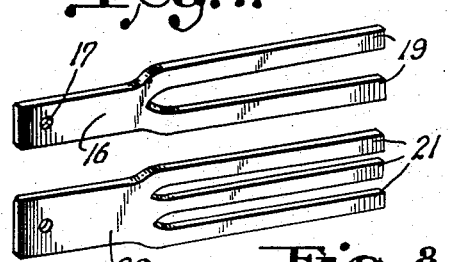
Bernard Turteltaub
INVENTOR
BY *Chnow+Co.*
ATTORNEYS.

United States Patent Office 2,873,769
Patented Feb. 17, 1959

2,873,769

PORTABLE LOCK FOR MOTOR VEHICLE PIVOTED WINDOWS

Bernard Turteltaub, Englewood, N. J.

Application January 12, 1956, Serial No. 558,669

1 Claim. (Cl. 292—288)

This invention relates to a portable lock for motor vehicle pivoted windows. By way of background, it might be stated that the recognized way of breaking into a locked car, is to manipulate the usual pivoted ventilating window of a motor vehicle car door to provide a slight opening between the ventilating window and the vertically sliding window of a car door through which a wire or suitable instrument is inserted to operate the car door lock to release the lock and open the door.

It is therefore the primary object of the present invention to provide a locking mechanism designed for use in locking the pivoted ventilating windows of a motor vehicle against opening by unauthorized persons.

An important object of the invention is to provide an auxiliary portable lock for the pivoted windows of a motor vehicle, which may be readily and easily positioned over the edge of the pivoted window, the lock including a pivoted locking member or arm adapted to swing over the edge of the adjacent vertically sliding window of a motor vehicle, to prevent horizontal pivotal movement of such locked pivoted window from the exterior of the vehicle.

Another object of the invention is to provide a portable lock which may be positioned over the edge of a pivoted vehicle window and adjusted to the desired location for the effective operation of the portable lock.

With the foregoing and other objects in view, which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is an enlarged fragmental elevational view of a motor vehicle body illustrating the pivoted ventilating window at one side of the vehicle as locked against movement by unauthorized persons, by means of the auxiliary lock forming the essence of the present invention.

Figure 2 is a fragmental elevational view of the windows of a motor vehicle, illustrating the lock as attached thereto.

Figure 3 is a vertical sectional view through the body portion of the lock, the pivoted locking arm being shown in full lines in an unlocked position.

Figure 4 is a sectional view taken on line 4—4 of Figure 2.

Figure 5 is a sectional view taken on line 5—5 of Figure 2.

Figure 6 is an enlarged transverse sectional view taken on line 6—6 of Figure 1.

Figure 7 is a perspective view of a modified form of locking arm.

Figure 8 is a perspective view of a further modified form of locking arm.

Referring to the drawings in detail, the reference character 5 indicates the vertically sliding window of a vehicle door as in its closed position, and the preference character 6 indicates the usual pivoted ventilating window operating adjacent to the forward edge of the vertically sliding window.

The auxiliary lock forming the subject matter of the present invention comprises a body portion indicated generally by the reference character 7 which is constructed of a length of wide steel metal of substantially U-shaped construction designed to fit over the edge of the usual pivoted ventilating window of a vehicle door.

The reference character 8 indicates a layer of felt which is secured to the inner surface of one side of the body portion 7, the felt layer being designed for contact with the window so that the metallic body portion of the lock will not scratch or mar the window over which it is positioned.

The inner side 9 of the lock supports the pivoted lock-arm 10 which moves through a vertical slot 11 formed in the end wall 12 of the body portion 7, as better shown by Figure 4 of the drawings, the locking arm being so constructed and arranged that it will swing to a horizontal position as shown by Figure 2 of the drawings, where it will overlie and contact the usual metal trim indicated at 13 of the adjacent vertically sliding window 5 of the vehicle.

Spaced lugs 14 extend inwardly from the inner surface of the inner side 9 of the body portion, the space between the lugs 14 being such that they will contact with the edges of the locking arm 10, when the locking arm is moved to its horizontal position, thereby preventing accidental movement of the locking arm from its locked position to its unlocked position as shown in full lines in Figure 3 of the drawings.

A pair of lugs 15 also formed on the inner surface of the side wall 9 are so arranged that the locking arm will lie therebetween and be held against movement when the locking arm 10 is in its inactive or unlocked position.

It will of course be understood that these lugs are formed with rounded outer surfaces so that the locking arm may be forced thereover when it is desired to move the locking arm from its locked to its unlocked position, or vice versa.

In the modified forms of the locking arm, the locking arm as shown by Figure 7 comprises a main section 16 that is formed with an opening 17 to receive a pivot pin such as shown at 18 in the drawings.

As shown by Figure 8 of the drawings, the arm 20 is provided with a plurality of extensions 21 providing a substantially wider contact surface for contacting the vertically sliding motor vehicle window associated with the pivoted window on which the lock is positioned.

From the foregoing it will be seen that due to the construction shown and described, I have provided a portable lock which may be normally carried in the glove compartment of a car and readily positioned over the edge of the conventional pivoted ventilating window of a car door, so that the pivoted locking arm thereof may be swung to a position over the vertically sliding window to prevent opening of the pivoted window from the outside of the vehicle, and by unauthorized persons.

Having thus described the invention, I claim:

A portable motor vehicle ventilator window lock comprising a substantially U-shaped body adapted to be fitted over one edge of a ventilator window mounted adjacent to a vertical sliding window, a locking arm pivotally connected to said body adapted to swing to a horizontal position in contact with the adjacent sliding window, in locking said ventilating window in its closed position, and right angularly related pairs of lugs extending inwardly from said U-shaped body with which said arm contacts, securing said arm in either a locked position or released position.

References Cited in the file of this patent

UNITED STATES PATENTS

| | | |
|---|---|---|
| 1,288,988 | Reed | Dec. 24, 1918 |
| 2,033,104 | Brown | Mar. 3, 1936 |
| 2,151,934 | Parrott | Mar. 28, 1939 |